No. 734,085. PATENTED JULY 21, 1903.
J. P. O'MARA & J. S. BOA.
DEVICE FOR STRIPING AND SPOTTING POOL BALLS.
APPLICATION FILED MAY 6, 1903.
NO MODEL. 2 SHEETS—SHEET 1.
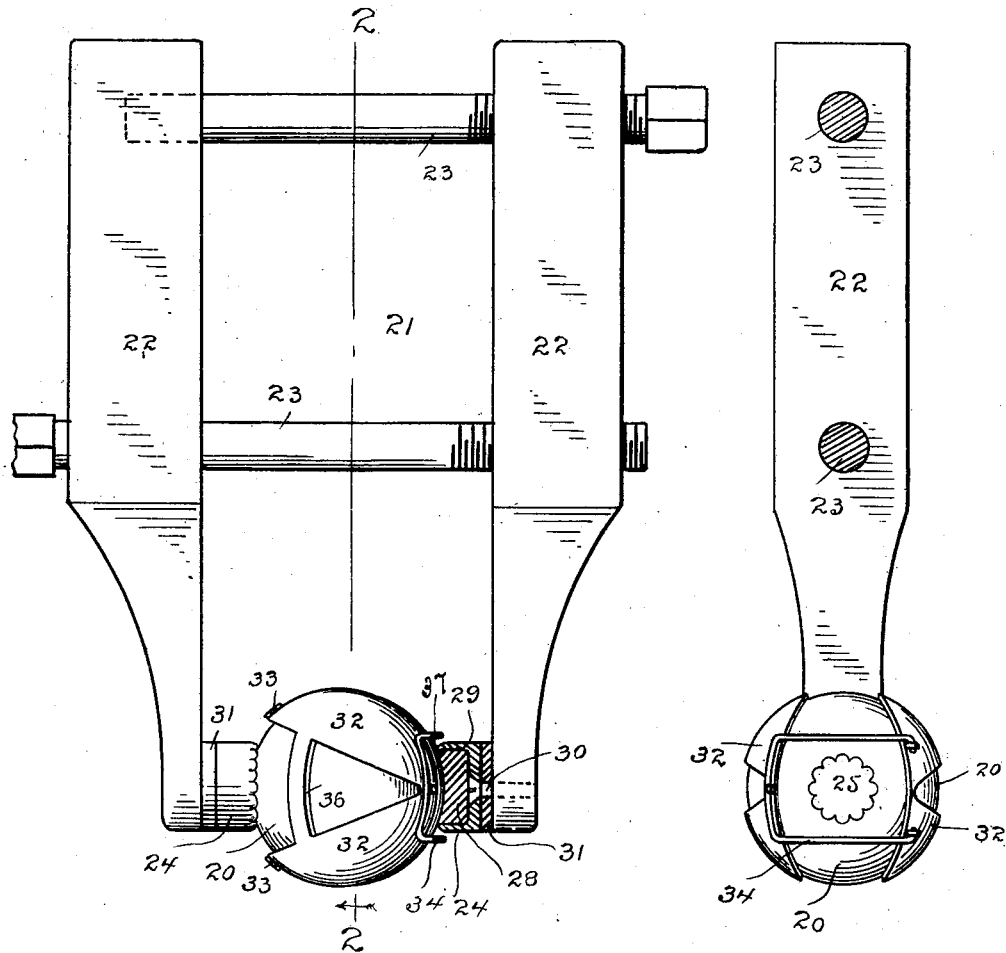
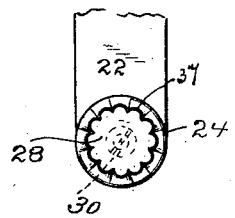
WITNESSES.
H. A. Lamb.
S. W. Atherton.
INVENTORS
Joseph P. O'Mara and
John S. Boa
By A. M. Wooster
Atty.

No. 734,085. PATENTED JULY 21, 1903.
J. P. O'MARA & J. S. BOA.
DEVICE FOR STRIPING AND SPOTTING POOL BALLS
APPLICATION FILED MAY 6, 1903.
NO MODEL. 2 SHEETS—SHEET 2.

WITNESSES.
H. A. Lamb.
S. W. Atherton.

INVENTORS
Joseph P. O'Mara and
John S. Boa
By A. M. Wooster
Atty.

No. 734,085. Patented July 21, 1903.

UNITED STATES PATENT OFFICE.

JOSEPH P. O'MARA AND JOHN S. BOA, OF BRIDGEPORT, CONNECTICUT.

DEVICE FOR STRIPING AND SPOTTING POOL-BALLS.

SPECIFICATION forming part of Letters Patent No. 734,085, dated July 21, 1903.

Application filed May 6, 1903. Serial No. 155,937. (No model.)

*To all whom it may concern:*

Be it known that we, JOSEPH P. O'MARA and JOHN S. BOA, citizens of the United States, residing at Bridgeport, county of Fairfield, State of Connecticut, have invented a new and useful Device for Striping and Spotting Pool-Balls, of which the following is a specification.

Our invention has for its object to provide a simple and inexpensive device for striping and spotting pool-balls which may be quickly and easily operated and without special skill in the art, will enable the operator to hold the ball in the dye for any required length of time and without putting his hands in the dye, and which will accurately center and spot the balls as well as accurately stripe them at a single operation, the stripes and spots of every pattern being accurately and uniformly applied and without danger of spoiling balls by the dye spreading over the imaginary lines which bound the stripes and spots.

With these and other objects in view the invention consists in certain constructions and in certain parts, improvements, and combinations, which will be hereinafter described and then specifically pointed out in the claims hereunto appended.

Figure 4:
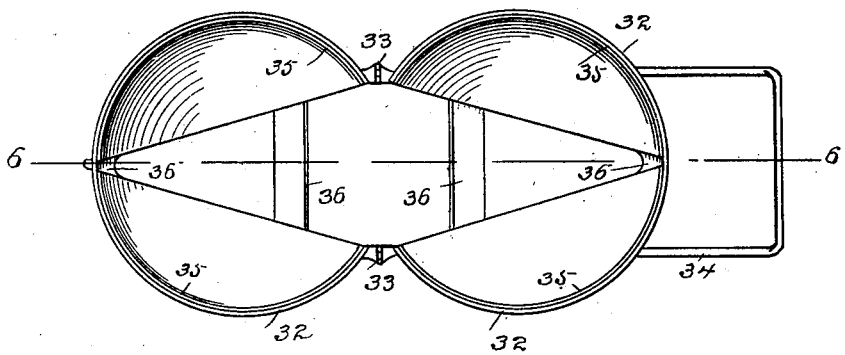
Figure 5:
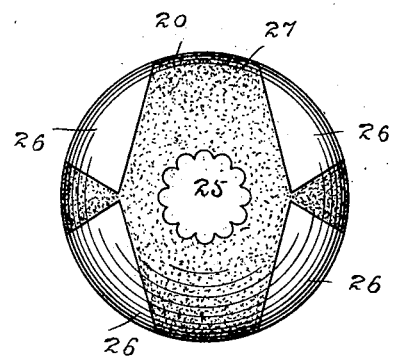
Figure 6:
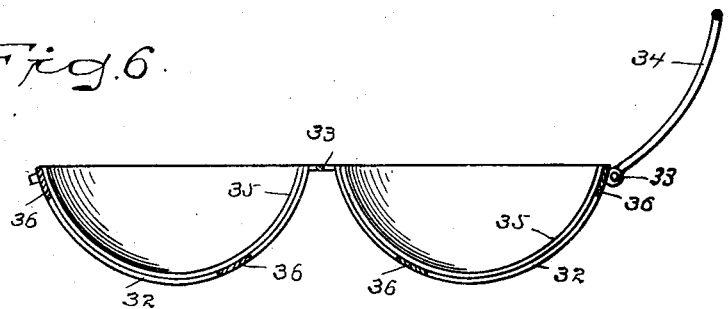

In the accompanying drawings, forming part of this specification, in which like characters of reference indicate the same parts, Figure 1 is a side elevation illustrating the use of our novel striping and spotting device, one of the spotting-dies being in section; Fig. 2, a section on the line 2 2 in Fig. 1 looking toward the left; Fig. 3, a detail face view of one of the spotting-dies; Fig. 4, a view, on an enlarged scale, showing the striping-dies opened out from the position in which they appear in Fig. 2; Fig. 5, a view of a striped and spotted ball as removed from the dies, the position being the same as in Fig. 2; and Fig. 6 is a section on the line 6 6 in Fig. 4.

A pool-ball (indicated by 20) while being striped is held by a clamp, which as a whole we have indicated by 21. The clamp comprises arms, (indicated specifically by 22,) which are caused to retain the ball by means of screws 23. The essential feature of the clamp is that each of the arms is provided with a spotting-die, (indicated as a whole by 24,) which centers the ball and also spots it. It should be understood that the principle upon which pool-balls are surface striped and spotted is to protect certain portions of the surface of the balls while they are being dipped in the dye, so that the protected portions of the surface will remain perfectly white, the dye acting upon the unprotected portions of the surface to form stripes and also to form the masses of color surrounding the spots which are white. This will be readily understood from Fig. 5 in connection with Figs. 1 and 2, in which we have indicated the spots by 25, the white portions of the surface of the ball by 26, and the colored portions by 27.

The construction and operation of spotting-dies 24, which are carried by the arms of the clamp, will be clearly understood from Figs. 1 and 3. Each die consists of a block of metal having a central socket 29 and a spotting edge 37. The spotting edge has imparted to it in outline the exact contour of the spots it is desired to produce and in plan a concavity corresponding exactly with the convexity of the balls to be spotted. Within the sockets are preferably placed pads of rubber, which fit the sockets closely and also closely engage the surface of a ball that is being spotted, so as to render it impossible for any of the dye to pass the spotting edge and act upon the portion of the surface of the ball that is inclosed by the spotting edge. Each block is secured to an arm of the clamp by a screw 30, a suitable cushion 31, of rubber or felt, being interposed between the die and the arm of the clamp, so as to give ample freedom of movement to the die in seating itself upon the surface of a ball.

32 denotes the striping dies or plates. These dies are made in two parts, hinged together, as at 33, and provided with a suitable locking-catch 34, by which they are held clamped about the ball, as clearly shown in the drawings, it being, of course, immaterial what special form of locking-catch is used.

As already stated, the gist of the invention lies in effectually protecting certain portions of the surface of the ball from the action of the dye while the ball is immersed in the dye.

It is obvious that the invention is not limited to any special design of stripes, figures, or spots. In order to accomplish the desired result in producing stripes or figures, we line the inner surface of the "striping-dies," so called, but which might with equal propriety be called "figuring-dies," or portions of the inner surface thereof with rubber pads 35, which for convenience we term "striping-pads," although the production of stripes is not an essential portion of the invention, which is adapted to produce figures as well. These "striping-pads," so called, protect the portions of the surface of the ball that are not to be acted upon by the dye when the ball is immersed in the dye. For convenience in forming the striping-dies portions thereof may be joined by cross-pieces, as at 36. These cross-pieces, however, are not provided with striping-pads unless it should be desired to reproduce the outlines of the cross-pieces in striping or figuring the balls.

The operation consists simply in placing the striping-dies about a ball and locking them in place by means of the catch, as in Figs. 1 and 2, then placing the ball properly positioned between the spotting-pads upon the clamp, which when one or both of the screws of the clamp are tightened up are self-centering upon the ball, so as to insure that the spots are directly opposite to each other. Having tightened up the screws of the clamp sufficiently to hold the ball, the ball while held in the clamp is dipped in the dye and allowed to remain as long as may be necessary to fix an even color upon the unprotected parts of the surface thereof.

Having thus described our invention, we claim—

1. A striping device for pool-balls comprising dies having upon their inner surface rubber striping-pads whereby portions of the surface of the ball are protected from the action of dye and a clamp for holding the balls suspended in dye.

2. A striping and spotting device for billiard-balls, comprising dies having upon their inner surface rubber striping-pads whereby portions of the surface of the ball are protected from the action of dye, and a clamp provided with centering and spotting dies whereby the ball may be held suspended in dye, the portions of the surface not protected by the striping and spotting dies being subject to the action of the dye while the ball is held suspended therein.

3. The striping-dies 32 hinged together as shown and provided with a locking-catch and having upon their inner faces rubber striping-pads whereby portions of the surface of a ball are protected from the action of dye while suspended therein.

4. A spotting device for pool-balls comprising a clamp consisting of arms and screws, each arm being provided with a concave centering and spotting die, substantially as shown, for the purpose specified.

5. A spotting device for pool-balls comprising a clamp consisting of arms 22 and screws 23, each arm being provided with a spotting-die, a concave block of rubber inclosed therein, a cushion interposed between the die and the arm and a screw 30 passing through the bottom of the die and the cushion and engaging the arm.

6. A spotting device for pool-balls comprising a clamp consisting of arms and screws, each arm being provided with a spotting-die consisting of a spotting edge, a central socket and a pad of rubber therein which corresponds in outline with the cutting edge, whereby the edge of the spot produced thereby when the ball is dipped in dye has imparted to it a corresponding configuration.

7. The striping-dies 32 hinged together as shown and having upon their inner faces rubber striping-pads whereby portions of the surface of a ball are protected from the action of dye while suspended therein, parts of the dies being connected by cross-pieces, substantially as shown, for the purpose specified.

In testimony whereof we affix our signatures in presence of two witnesses.

JOSEPH P. O'MARA.
JOHN S. BOA.

Witnesses:
A. M. WOOSTER,
S. W. ATHERTON.